United States Patent [19]

Olson

[11] Patent Number: 4,487,088
[45] Date of Patent: Dec. 11, 1984

[54] SPROCKET CONSTRUCTION FOR A ZERO CATERNARY CHAIN

[75] Inventor: George E. Olson, Arlington Heights, Ill.

[73] Assignee: A. O. Smith Harvestore Products, Inc., Arlington Heights, Ill.

[21] Appl. No.: 362,920

[22] Filed: Mar. 29, 1982

[51] Int. Cl.³ .............. F16H 55/17; F16H 55/30; F16H 55/06; F16H 55/08
[52] U.S. Cl. .................................. 74/462; 74/460; 474/152
[58] Field of Search .......... 74/462, 460; 474/902, 474/155, 152

[56] References Cited

U.S. PATENT DOCUMENTS

| | | | |
|---|---|---|---|
| 2,314,969 | 3/1943 | Briggs | 474/902 |
| 2,635,770 | 4/1953 | Tiedemann | 214/17 |
| 3,154,958 | 11/1964 | Cadwell et al. | 474/902 |
| 3,216,269 | 11/1965 | McCord | 474/902 |
| 3,350,950 | 11/1967 | Gandrud | 474/902 |
| 4,036,071 | 7/1977 | McKnight et al. | 74/462 |
| 4,058,023 | 11/1977 | Smith | 474/902 |
| 4,095,478 | 6/1978 | Rynik | 474/155 |
| 4,177,684 | 12/1979 | White et al. | 474/902 |
| 4,278,303 | 7/1981 | Livesay | 474/902 |

Primary Examiner—Lawrence J. Staab
Assistant Examiner—Michael D. Bednarek
Attorney, Agent, or Firm—Andrus, Sceales, Starke & Sawall

[57] ABSTRACT

A sprocket construction for a zero caternary chain. In a zero caternary chain, a tensioning system is utilized to prevent caternary or slack in the chain and as a result of the high degree of tensioning, the bushings of the chain ride against the roots of the sprocket teeth. To prevent erosion of the sprocket teeth and bushings, the root diameter is modified to provide an enlarged operating pitch diameter for a predetermined increase in pitch length of the link. The pitch line clearance is enlarged so that it is equal to 2% to 25% of the working pitch diameter and produces a pressure angle of 20° to 40°.

2 Claims, 3 Drawing Figures

U.S. Patent    Dec. 11, 1984    4,487,088
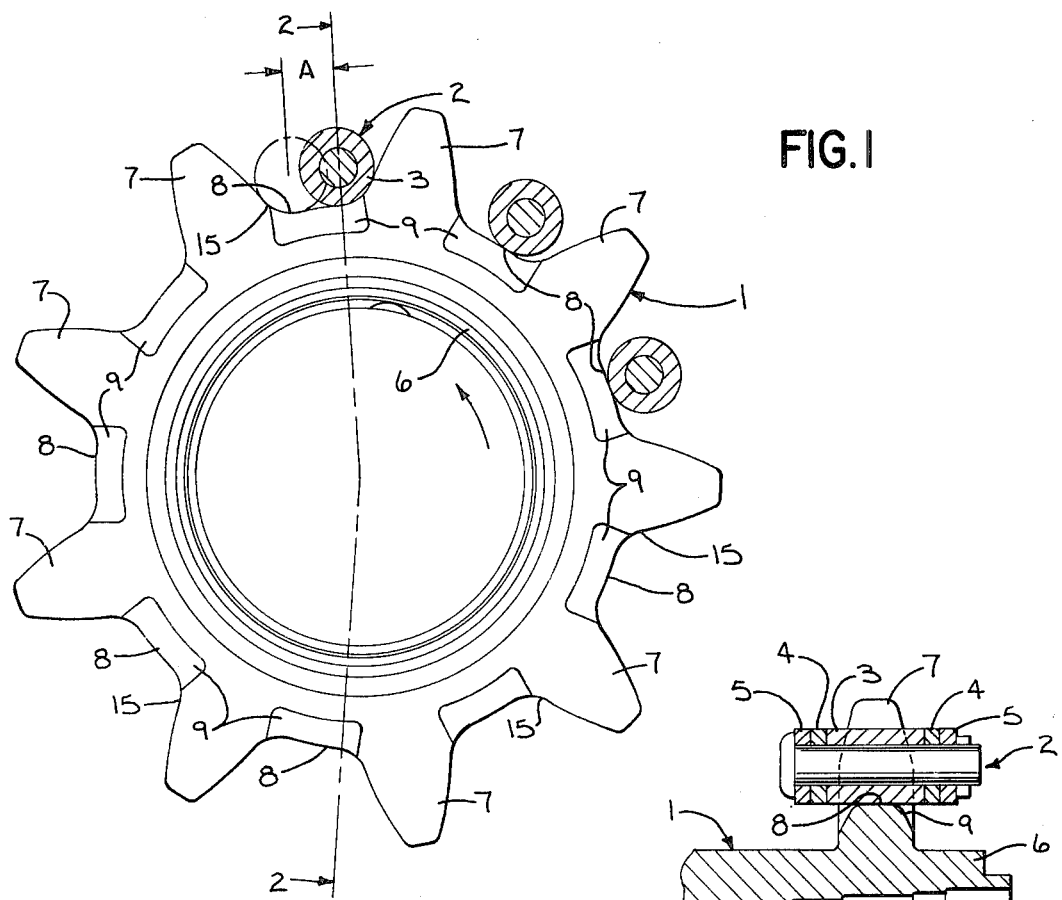
FIG.1
FIG.2
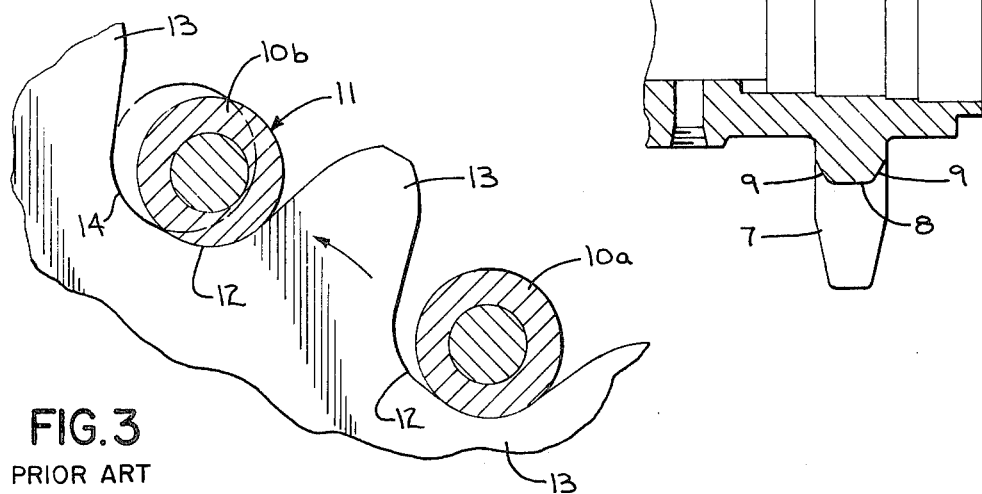
FIG.3
PRIOR ART

SPROCKET CONSTRUCTION FOR A ZERO CATERNARY CHAIN

BACKGROUND OF THE INVENTION

In air-tight storage structures for storing silage or the like, a bottom unloader is employed having a rotating cutter arm which undercuts the silage and conveys the silage to the inner end of a trough formed in the foundation of the silo. A discharge conveyor operating within the trough then conveys the silage to the exterior of the silo.

In a bottom unloader, as disclosed in the U.S. Pat. No. 2,635,770, the cutter arm includes an endless cutter chain that is engaged with a drive sprocket located at the inner end of the arm and with an idler sprocket mounted on the outer end of the cutter arm. Spaced along the length of the cutter chain are a series of knives that cut and dislodge the silage and convey the silage to the inner end of the trough as the chain travels in its endless path.

The cutter chain travels in a horizontal plane and as the knives or teeth on the cutter chain travel in close proximity to the foundation of the storage structure, sag cannot be tolerated in the chain so that a zero catenary chain system is utilized.

Chains which operate with zero catenary require special attention, due to the forces generated in the system by virtue of pre-tension on the chain. With a zero catenary system the chain bushings are biased inwardly against the roots of the sprocket teeth by the tensioning force and the links cannot move outwardly along the sprocket tooth as the links elongate due to wear. This is due to the fact that the pre-tensioning in the system exceeds the ejection force so that the chain roller or bushing is maintained on the sprocket root. The pre-tensioning thus forces the bushing to move along the root of the sprocket tooth to compensate for its increase in pitch length. As the elongation of the link continues, the bushing will contact the junction between the root and the non-driving tooth face of the next succeeding sprocket tooth, causing erosion of this area of the sprocket, as well as the bushing, and resulting in premature failure of the chain and sprocket.

SUMMARY OF THE INVENTION

The invention is directed to a chain drive mechanism having an improved sprocket construction. The chain operates in a zero catenary mode with a pre-tensioning system being utilized to prevent catenary in the chain during its operation. In accordance with the invention, the pitch line clearance is enlarged so that it is equal to 2% to 25% of the working pitch diameter and produces a pressure angle of 20° to 40°. Thus, elongation of the chain pitch, which occurs due to wear, is accommodated by the enlargement of the root area between adjacent teeth, thereby preventing erosion of the root area and chain bushings.

Other objects and advantages will appear in the course of the following description.

DESCRIPTION OF THE DRAWINGS

The drawings illustrate the best mode presently contemplated of carrying out the invention.

In the drawings:

FIG. 1 is a plan view of a sprocket made in accordance with the invention;

FIG. 2 is a transverse section taken along line 2—2 of FIG. 1; and

FIG. 3 is a fragmentary plan view of a prior art sprocket.

DESCRIPTION OF THE ILLUSTRATED EMBODIMENT

FIGS. 1 and 2 illustrate a chain drive mechanism of the invention which includes a sprocket 1 that drives an endless chain 2. The chain drive is particularly adaptable for use with a bottom unloader in a sealed storage structure as disclosed in U.S. Pat. No. 2,635,770. In this type of installation, the drive sprocket 1 is located at the center of the silo and is mounted on the inner end of a rotatable cutter arm. Chain 2 is trained about drive sprocket 1 and about an idler sprocket, not shown, which is located at the outer end of the cutter arm, and the chain travels in a horizontal plane. In a chain drive mechanism of this type, a plurality of cutter teeth or knives are mounted on the chain and act to cut or dislodge the silage as the cutter arm travels in its endless path and as the cutter arm rotates within the silo. Because the cutter teeth are traveling in close proximity to the foundation of the silo, the chain operates in a zero catenary mode, meaning that there is substantially no slack in the chain.

Chain 2 is a conventional chain composed of a plurality of bushings 3 and interconnecting links 4. Pins 5 extend through the bushings 3 and pivotally connect the links 5 together in a conventional manner.

Sprocket 1 includes a hub portion 6 and a plurality of teeth 7 that extend outwardly from hub 5. Adjacent teeth are connected by a root 8 and because of the zero caternary in the chain the bushings 3 are in direct contact with the root 8, as illustrated in FIG. 1.

To prevent jamming of the silage or stored material in the roots 8, a relief pocket or recess 9 is formed in each root on both sides of the sprocket to aid in the discharge of the stored material from the root area.

In a conventional chain drive, the bushings of the chain are spaced slightly out of contact with the root between adjacent sprocket teeth. During use, the pitch of the chain will tend to elongate due to wear, and with a conventional chain, the bushings move outwardly along the teeth to accommodate the elongation in pitch of the chain links. However, with a zero catenary system, in which pre-tensioning urges the bushings into tight engagement with the root 8, the chain cannot move outwardly along the teeth to compensate for an increase in chain pitch, and therefore the increase in pitch can cause the bushing to move along the root into contact with the trailing or non-driving face of the next sprocket tooth, causing erosion of the junction between the root and the tooth face, as well as the chain bushing. For example, FIG. 3 shows a prior art, zero catenary chain drive. In this prior art construction, the bushings 10 of chain 11 are in engagement with root 12 between sprocket teeth 13, and as the pitch or distance between bushings 10a and 10b increases due to wear, the bushing 10b will move into contact with the trailing or non-driving face 14 of the sprocket tooth, as shown by the phantom lines in FIG. 3, thereby causing erosion of the area 14, as well as abrasion of the bushing.

In accordance with the invention, erosion of the root area in a zero catenary system, due to elongation of the pitch, is prevented by enlarging the root area 8, as shown in FIG. 1, so that the pitch line clearance indicated by A in FIG. 1 is equal to 2% to 25% of the operating pitch diameter and produces a pressure angle of 20° to 40°. With this construction, elongation of the chain pitch will not move the bushing 3 into engagement with the trailing face 15 of the teeth 7, so that there will be no erosion at area 15, as in the prior art.

More specifically, the desired enlargement in pitch line clearance can be determined from the formula:

$$\Delta C_p = 2\sin\left(\frac{180}{n}\right)(D_o - D_m) + A_t$$

where $\Delta C_p$ is the enlargement in pitch line clearance, $A_t$ is the accumulated total tolerance of chain links engaged with sprocket teeth, n is the number of teeth in the sprocket, $D_o$ is the operating pitch diameter, and $D_m$ is the calculated pitch diameter.

The operating pitch diameter can be determined from the following formula:

$$D_o = \frac{P + \Delta P}{\sin\left(\frac{180}{n}\right)}$$

where P is the pitch and $\Delta P$ is the increase in pitch.

The pitch diameter $D_m$ can be determined from the formula:

$$D_m = \frac{P}{\sin\left(\frac{180}{n}\right)}$$

Therefore, enlarging the root area compensates for the elongation or increase in the pitch of the chain to eliminate erosion of the sprocket teeth and the chain bushings.

Various modes of carrying out the invention are contemplated as being within the scope of the following claims particularly pointing out and distinctly claiming the subject matter which is regarded as the invention.

I claim:

1. A chain sprocket drive construction, comprising a sprocket having a plurality of teeth with the bases of adjacent teeth being connected by roots, and a chain engaged with the sprocket and including a plurality of bushings pivotally interconnected by links, said chain having substantially zero catenary and said bushings disposed to directly engage the roots as the sprocket is rotated, the pitch line clearance of said sprocket being enlarged and having the formula of:

$$\Delta C_p = 2\sin\left(\frac{180}{n}\right)(D_o - D_m) + A_t$$

where $\Delta C_p$ is the enlargement in pitch line clearance, $A_t$ is the accumulated total tolerance of chain links engaged with sprocket teeth, n is the number of teeth in the sprocket, $D_o$ is the operating pitch diameter, and $D_m$ is the calculated pitch diameter, the operating pitch diameter having the formula of:

$$D_o = \frac{P + \Delta P}{\sin\left(\frac{180}{n}\right)}$$

where P is the pitch and $\Delta P$ is the increase in pitch, the pitch diameter $D_m$ having the formula of:

$$D_m = \frac{P}{\sin\left(\frac{180}{n}\right)}$$

2. The construction of claim 1, wherein each root is provided with a sloping relief pocket.

* * * * *